Dec. 16, 1958 R. D. MAY 2,864,502
METHODS AND MEANS FOR THE TREATMENT OF
OIL, GAS AND WATER EMULSIONS
Filed April 26, 1954 8 Sheets-Sheet 3

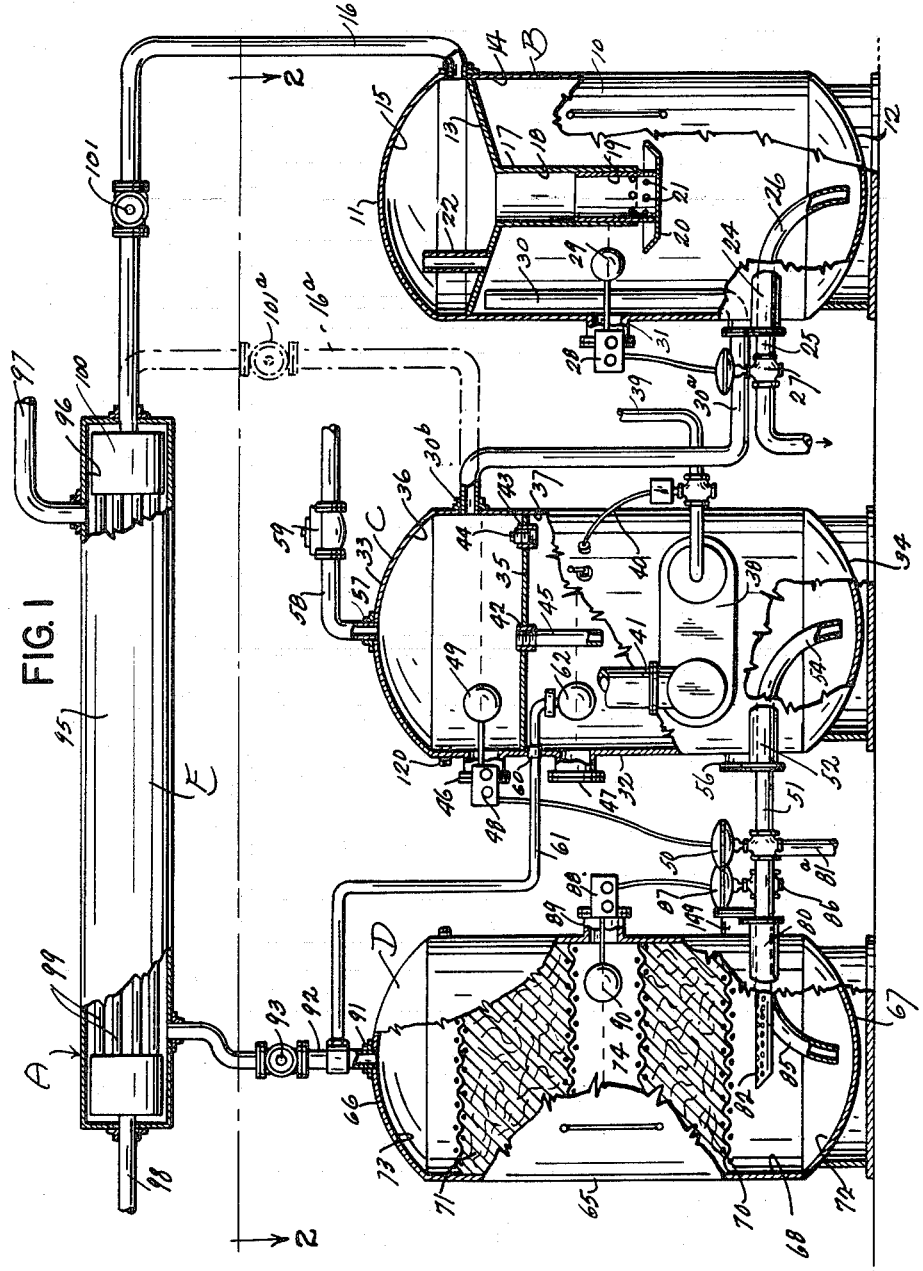

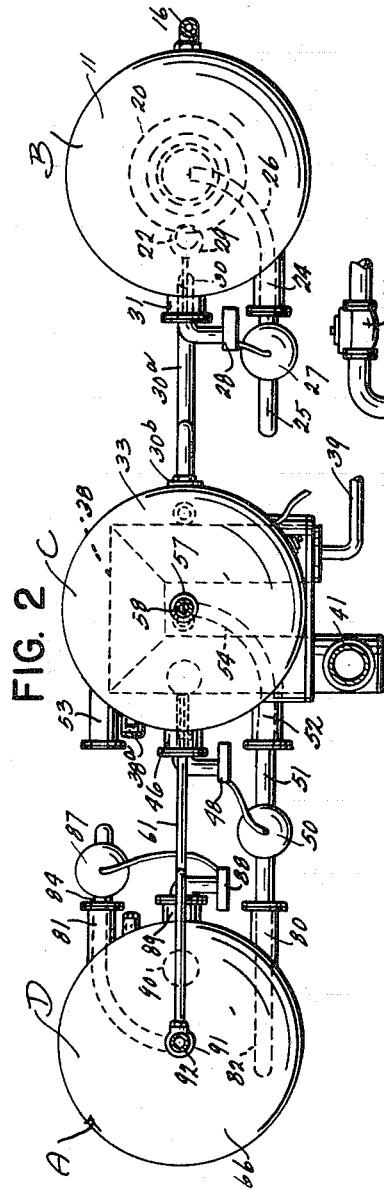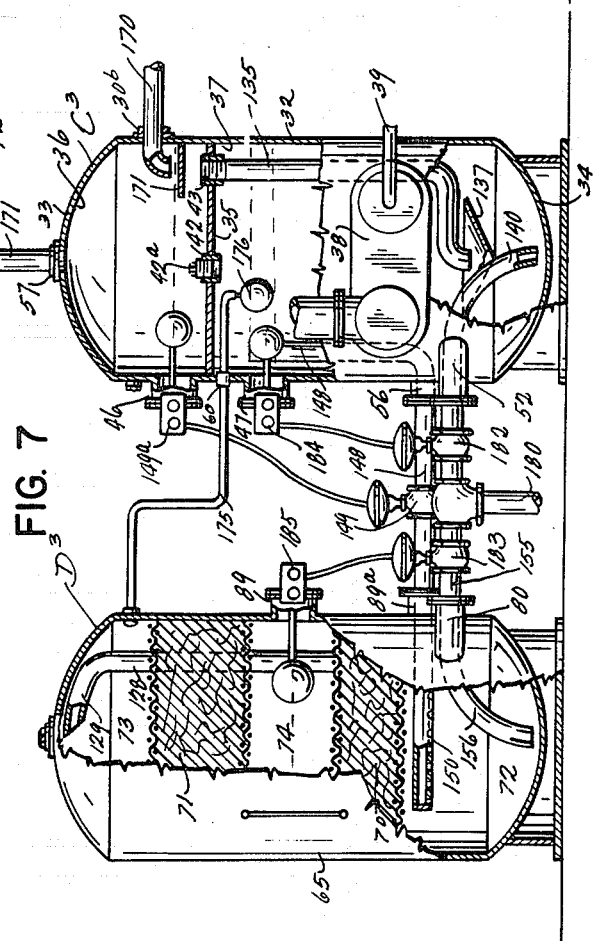

INVENTOR
Russell D. May
BY
ATTORNEYS

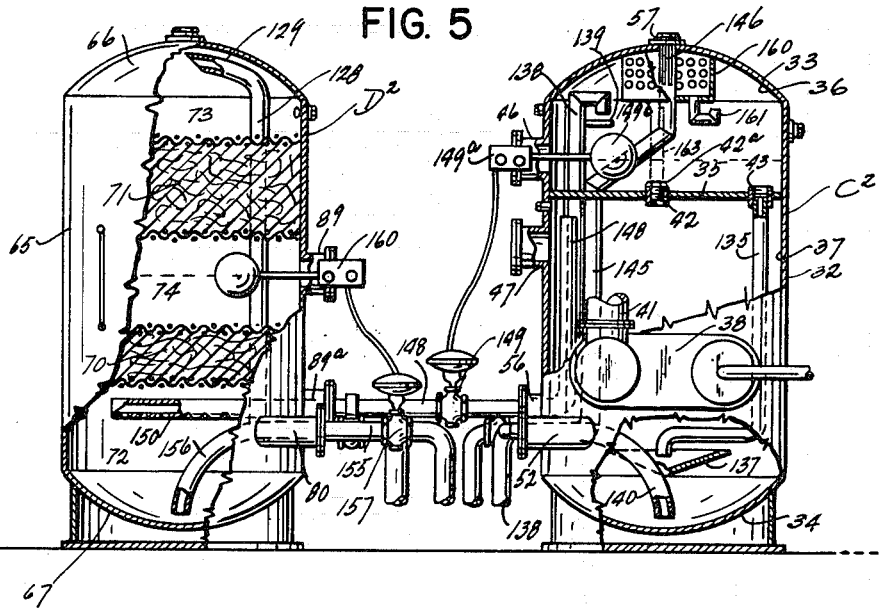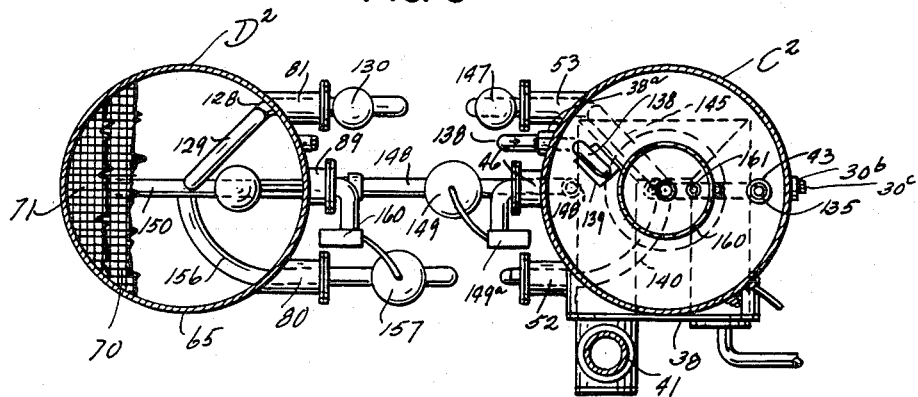

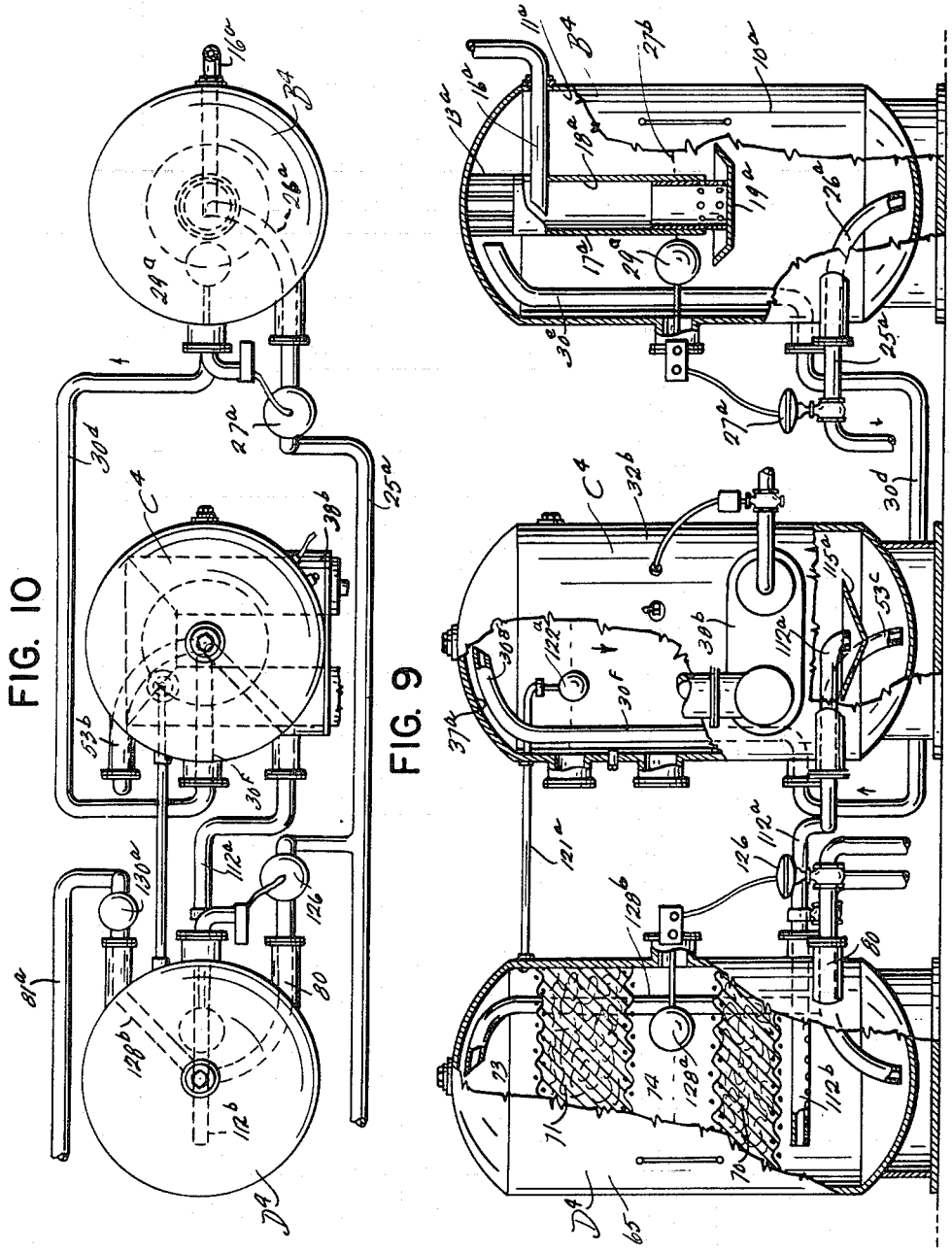

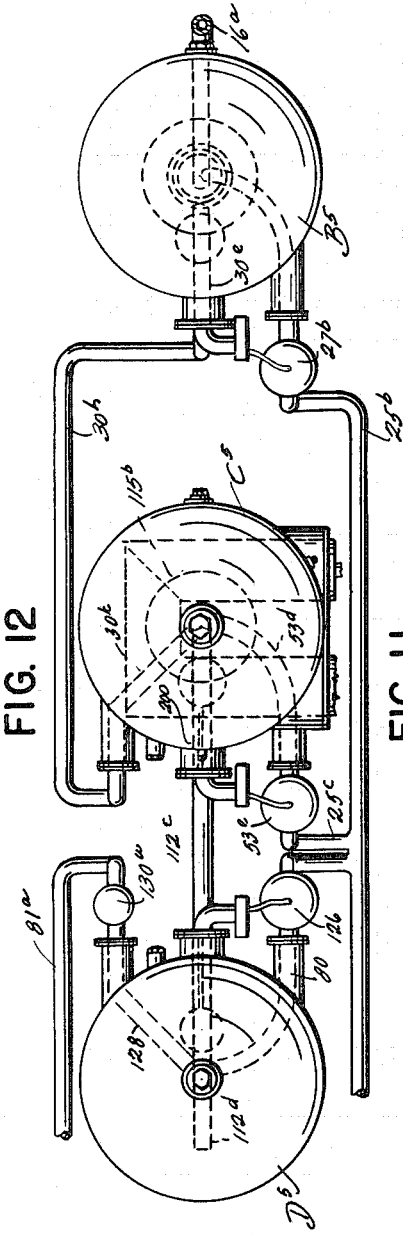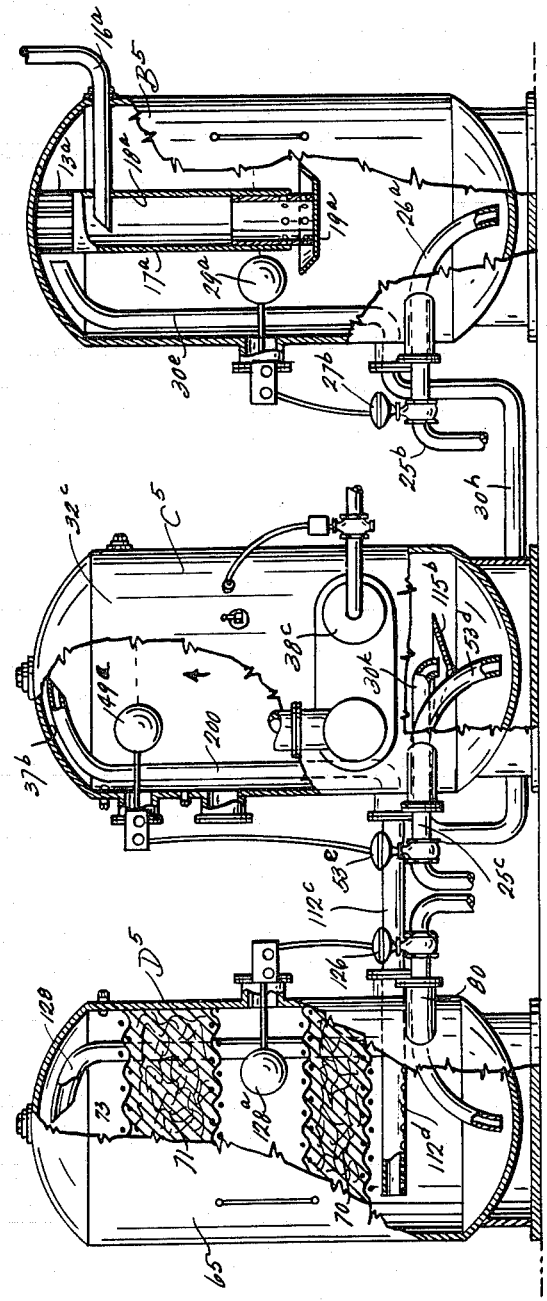

Dec. 16, 1958 R. D. MAY 2,864,502
METHODS AND MEANS FOR THE TREATMENT OF
OIL, GAS AND WATER EMULSIONS
Filed April 26, 1954 8 Sheets-Sheet 8

INVENTOR
Russell D. May

BY
ATTORNEYS

United States Patent Office 2,864,502
Patented Dec. 16, 1958

2,864,502

METHODS AND MEANS FOR THE TREATMENT OF OIL, GAS AND WATER EMULSIONS

Russell D. May, Tulsa, Okla., assignor to $H_2$ Oil Engineering Corporation, Tulsa, Okla., a corporation of Oklahoma Application April 26, 1954, Serial No. 425,523

20 Claims. (Cl. 210—72)

This invention relates to improvements in methods and means for the separation of oil, gas and water emulsions.

More specifically, this invention relates to a system for the successive treatment of petroleum emulsions, wherein the emulsion and the constituent parts thereof are treated in separate stages maintained under constant hydrostatic pressure; the various stage tanks employed being standardized as to construction so that with facility they may be connected together to provide various processing treatments of the emulsion and its constituent parts for the most satisfactory recovery of the constituent parts of the initial product to be treated.

The primary object of this invention is the provision of an improved system for resolving oil and water emulsions wherein the emulsion and the constituent parts thereof are treated in separate stages and maintained under constant hydrostatic pressure; the system including selectively usable free water knockout, heating, and filtering and stabilizing stages; the structural features of which are such as to provide a flexible, compact, economical, efficient and safe arrangement of parts for the treatment of emulsions which may vary widely in relative proportion of constituent parts.

A further object of this invention is the provision of an improved hydraulic pressure system for resolving petroleum emulsions having a down flow treatment of the emulsion under pressure, heat, and flow regulated conditions, such as will produce a high gravity oil.

A further object of this invention is the provision of an improved treating system for resolving petroleum emulsions under continuous flow conditions, in separate stages; the various stage tanks employed being standardized as to construction so that with facility they may be connected together to provide various processing treatments of the emulsion and its constituent parts for the most satisfactory recovery of the constituent parts of the initial product to be treated.

A further object of this invention is the provision of an improved free water knockout for the initial treatment of petroleum emulsions such as will leave the residue emulsion to be treated in proper condition for efficient treatment in later heating and separating stages.

A further object of this invention is the provision of an improved emulsion breakdown heating tank wherein petroleum emulsions may be properly treated under downflow conditions for the most efficient control of the constituent parts; the same including a heater which is maintained in operating condition with a minimum of corrosion and alkaline deposits thereon because of its location in the improved system of treatment.

A further object of this invention is the provision of an improved filtering and separating stage treatment for resolving petroleum emulsions wherein the constituent parts of heat treated emulsions are delicately controlled under pressure conditions such as will provide for the recovery of high gravity oil, with or without entrained condensed rich vapor ends.

A further object of this invention is the provision of an improved continuous flow system for the separation of the constituent parts of petroleum emulsions including a plurality of separate stage treatments including free water knockout stage; emulsion heating and breaking stage; filtering and separating stage, and a heat exchange treatment for the incoming emulsified petroleum.

A further object of this invention is the provision of an improved system for the separation of oil-water emulsions by sonic vibration. In this connection the oil-water emulsion is passed through a transducer and utilizes ultrasonic energy for breaking emulsions of oil and water.

Other objects and advantages of this invention will be apparent during the course of the following detailed description.

In the accompanying drawings, forming a part of this specification, and wherein similar reference characters designate corresponding parts throughout the several views:

Fig. 1 is a view, partly in section, and partly diagrammatic, showing a multiple stage treatment of resolving petroleum emulsions into their constituent parts.

Fig. 2 is a fragmentary plan view of the system illustrated in Fig. 1.

Fig. 5 is a side elevation, partly sectional and partly diagrammatic, showing a two stage treatment for hydrocarbon emulsions wherein the heating and filter stage controls are arranged differently than those shown in the two stage treatment of Fig. 3, and wherein there is a gas recovery step.

Fig. 6 is a sectional plan view of the tanks shown in Fig. 5 with their tops removed.

Fig. 7 is a side elevation, partly sectional and partly diagrammatic, showing a heating and filter stage treatment for petroleum emulsions wherein formation gases may be removed during the heating stage treatment under pressure controlled treatment.

Fig. 9 is a fragmentary side elevation partly in section, showing a multiple stage downflow treatment of petroleum emulsions for separating them into their constituent parts.

Fig. 10 is a plan view of the system shown in Fig. 9.

Fig. 11 is a side elevation, partly in section, of an upflow system for treating petroleum emulsions.

Fig. 12 is a plan view of the system shown in Fig. 11.

Figure 3:
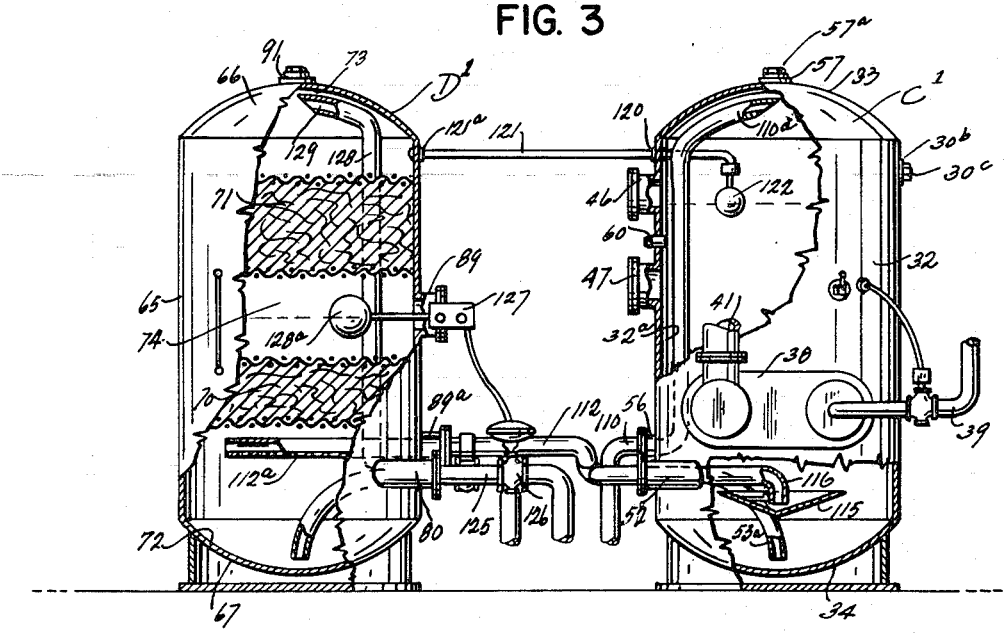
Fig. 3 is a side elevation, partly sectional and partly diagrammatic, of a two stage heating and filtering treatment for resolving hydrocarbon emulsions in a system wherein their is no intermediate gas recovery separation, and wherein it is not deemed necessary to provide a free water knockout initial treatment of the emulsified hydrocarbon emulsion.

In the drawings, wherein for the purpose of illustration is shown a multiple stage treatment for petroleum emulsions, and wherein the structural features of the tanks are so standardized as to enable manipulated arrangement of the details thereof for the optimum treatment of emulsified petroleum according to the characteristic proportions of the constituent parts thereof, the letter A may generally designate a multiple stage treatment apparatus, as shown in Figs. 1 and 2, wherein separate stage treating devices are used, which may appropriately be referred to as a free water knockout stage B; the heater stage C and filter and stabilizer stage D. Part of the system includes a heat exchanger E, which receives hot demulsified oil from the filter stage treatment D for initially heating the emulsified product to a predetermined temperature which will best serve the purpose of controlling and manipulating the same through the various stage treatments B, C and D, for the most beneficial recovery of the constituent parts.

Figure 4:
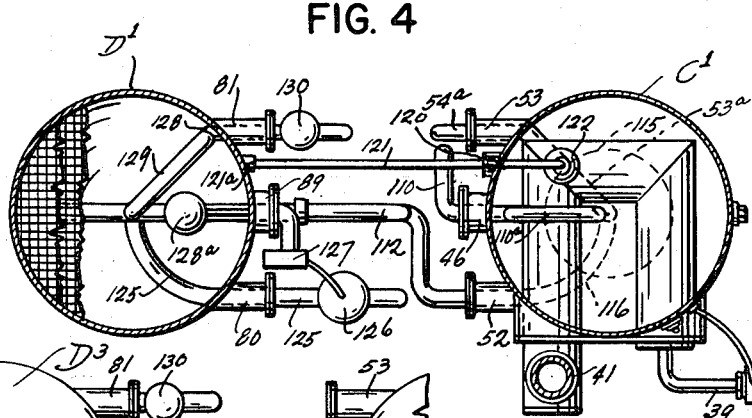
Fig. 4 is a plan view of the tanks shown in Fig. 3 with their tops removed.

Referring to the form of invention shown in Figs. 3 and 4, wherein is shown a two stage heater and filter treatment, the reference character $C^1$ may designate the heating stage, and $D^1$ represents the filter and stabilizing stage treatment.

Referring to Figs. 5 and 6, wherein is also shown a heater and filter stage treatment wherein the heater stage $C^2$ is shown in association with the filter and stabilizing stage $D^2$.

Figure 8:
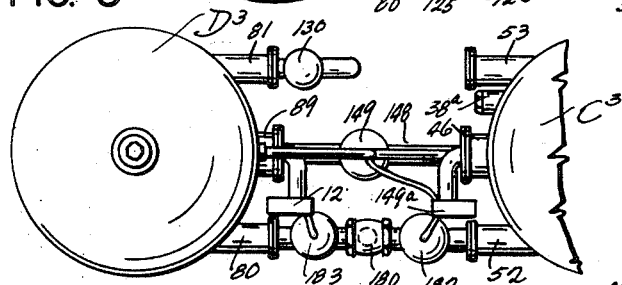
Fig. 8 is a fragmentary plan view of the details shown in Fig. 7.

In Figs. 7 and 8 are shown a two-stage treatment including a heater stage $C^3$ and a filter stage $D^3$.

In so far as the heater tanks C, $C^1$ and $C^2$ and $C^3$ have common structural features, similar reference characters have been applied thereto for the various forms of invention shown. That is also true for the various filter and stabilizing tanks D, $D^1$, $D^2$ and $D^3$.

The free water knockout B is primarily used to quickly and efficiently separate water from petroleum emulsion which contains an unusually high water content, preliminary to breaking of the emulsion by means of heat treatment. It includes a vertically disposed cylindrical tank 10 having bulging top and bottom end walls 11 and 12 respectively. It is provided with an inverted cone shaped partition wall 13 quite close to the top wall 11 and facing the same. The main chamber 14 of the tank 10 lies below the partition wall 13. The top shallower chamber 15, of less volumetric capacity, is adapted to initially receive the emulsified product from an incoming pipe line 16. Centrally, the partition 13 is provided with a downwardly extending pipe 17, the passageway 18 of which at its lower end is provided with a height adjustable distributing head 19. The latter includes a pipe portion which telescopes into the passageway 18 and at its lower end is closed by a wall or baffle pan 20 which extends laterally so that the emulsified product will of necessity bubble through openings 21 in the pipe, and fall into the pan. This enables released gas to lighten the oil, and provides better water separation. An upstanding pipe 22 is mounted upon the partition wall 12 extending upwardly into the compartment 15. It has a passageway therein communicating compartments 14 and 15. Through this pipe pass the gases from compartment 15 to compartment 14. It permits a balance of pressure to exist between the compartments, and permits gas flow into pipe 30 together with discharged emulsion.

The tank 10 at its lower portion is provided with a coupling connection 24 for a water discharge pipe or line 25; the inner end of the line 25 curving downwardly at 26 towards the bottom of the compartment 14, centrally thereof. Externally of the tank the pipe 25 is provided with an automatically operated dump valve 27 operated by a conventional torque tube liquid level control 28. The latter is float operated, and the float 29 extends into the tank compartment 14 at a location where the same can be controlled due to variation in the density of the constituent parts of the emulsion; the water falling into the bottom of the compartment 14 below the float 29 and the emulsified oil lying in the upper part of the compartment above the float. Thus, free water is knocked out of the emulsion, as it settles in the tank preliminary to treatment of the emulsified oil. A pipe line 30 is vertically disposed inside of the compartment 14, along the wall of the tank; its lower end having a connection on tank 10 and passing at $30^a$ therefrom for connecting with the heater stage C. The pipe 30 opens at its top just under the partition wall 13. The emulsified oil at the top of the compartment 14 will flow downwardly into the pipe 30 and thence into the heater stage C. It is to be particularly noted that various tank bodies at different stages are provided with definitely located coupling connections for the mounting of the various pipes and controls. One of these connections is shown at 31 upon the tank 10, for the control 28.

In the free water knockout stage B liquid is maintained under constant hydrostatic pressure of such degree that a pump is not required to return the water knocked out at the dump valve to the makeup tank. In this stage of treatment there are no fluid disturbances such as will affect the level separation of the oil and water for proper operation of the float 29.

Referring to the heat treating stage C, the same includes a tank 32 of the same size and capacity as the tank 10, having outwardly bulged top and bottom walls 33 and 34. The chamber of the tank is subdivided by means of a horizontal partition wall 35, closer to the top wall 33 than the bottom wall of the tank, into an upper compartment 36 and a lower compartment 37. This wall 35 may be welded or otherwise secured to the tank in the position shown in Fig. 1.

The tank 32 supports a detachable U-shaped heater 38, preferably somewhat below the halfway distance of the height of the compartment 37. This burner or furnace 38 may use casing head gas as its fuel, admitted through a pipe 39, having the usual controls 40 associated therewith. The furnace 38 is bodily removable from the tank in accordance with well-known construction, and it includes an upstanding stack 41 externally of the tank. It will be noted from the dotted line shown in Fig. 2, that the U-shaped furnace pipes extend substantially entirely across the chamber 37.

The partition wall 35 is provided with a central internally screw threaded nipple 42 and a second screw threaded nipple 43, to one side. These nipples have passageways normally communicating the compartments 36 and 37 and are intended to receive different plugs and pipes, depending upon the type of treatment to be used. In the stage C, shown in Figs. 1 and 2, the nipple 43 receives a detachable screw plug 44 to seal off communication of the tank compartments, but nipple 42 receives a short downflow pipe 45 having a passageway communicating the compartments 36 and 37 and opening into the latter spaced above the furnace pipes.

The tank 32 is provided with tubular flanged control connections 46 and 47, respectively opening into the compartments 36 and 37 immediately at opposite sides of partition 35. They are intended to receive torque tube liquid level controls etc. In the stage C, the connection 47 is sealed off, but the connection 46 supports a torque tube liquid level control 48 having a pivoted float 49 which operates in the compartment 36 at the level of emulsified oil supplied thereto, to automatically actuate a flow control valve 50, in a line 51 which communicates the tanks of the stages C and D.

The tank 32 at its lower end is provided with a pair of outlet connections 52 and 53 (see Fig. 2) which may receive various pipes, etc. for the control of the various constituent parts of the product being treated. In the system A the connection 53 is sealed off, as shown in Fig. 2, but the connection 52 has the pipe 51 connected therewith, extending into the compartment 37 and being downturned and centrally opening into said compartment near the bottom wall 34, as indicated at 54. Between the connections 52 and 53, and somewhat higher, there is another connection 56, which is sealed off at the stage C, but which has its purpose in other setups to be subsequently described.

The top wall 33 of the tank has a central nipple 57, which in the stage C has a pipe line 58 leading off therefrom provided with a pressure regulating valve 59. This line 58 is intended to carry off formation gases. The pressure regulating valve 59 maintains a constant pressure of 30 pounds in the top of the tank with which it is connected, although this pressure may be varied as described.

The line 30ª from the water knockout tank 10 is connected to the tank 32 above the partition 35 as indicated at nipple 30ᵇ in Fig. 1 for carrying emulsified oil and gas into compartment 36 onto the partition 35. A gas line nipple connection 60 is provided in the tank 32 immediately below the partition 35, adapted to receive a gas line 61 which extends into the tank compartment 37 under the partition wall 35, and is provided with a float controlled valve 62. The outer end of the pipe 61 may connect in a portion of the stage D, as will be subsequently described. Gases are trapped in the top of the compartment 37 underneath the partition 35. The float of the mechanism 62 is positioned so that the level of the liquid in the compartment 37 will operate it, for venting rich gases from the compartment 37. It is to be noted that this level is represented by the dotted line shown in Fig. 1 at a location above the discharge end of the downflow tube 45.

It will be noted that emulsified oil at low temperature is passed downwardly over the hot oil arising after being heated by the furnace tubes. This downflow feed continually aids in preventing corrosion and alkaline deposits settling upon the burner pipes. This stage is important because rich vapor ends do not necessarily escape with the formation gas discharged from the line 58. They are transmitted through the line 61 and released into the body of recovered oil in which they are condensed and admixed. The gas which passes out of the line 61 is substantially at 60° F., since it is cooled by incoming emulsion.

It has been before mentioned that the emulsified oil entering the compartment 36 is at a temperature of approximately 60° F., and above the heater in the compartment 37 the same is heated to substantially 140° F. in order to break the emulsion.

It will be noted that up to this point there is an absolute control of pressure in the stages B and C; the continuous flow treatment taking place in a closed system, with the tanks B and C operating full of fluid at all times, with the exception of gas displacement areas. Back pressure control within the system, particularly at the stage C, results in increased gravity of the oil because of the condensing of rich vapors during such treatment.

Turbulence exists in the compartment 37 above the burner pipes due to thermo siphonic action of the liquid within the compartment. Fractionation occurs at the burner tubes; the light ends being condensed by the incoming colder emulsion. The gases which do not condense rise into the vapor trap at the top of the compartment 37 and are vented into the advance system as will be subsequently described.

It is to be understood that pressures may be so regulated as to insure maintenance of the proper superatmospheric pressures upon the product. It is even possible to do away with the escape of formation gases at the top of the tank C through the plugging of the nipple 57, if so desired.

Referring to the filter and stabilizing stage D, the same includes a tank 65 of the same volumetric capacity as the tanks of the stages B and C. This tank has outwardly bulged top and bottom walls 66 and 67. The chamber 68 is provided with a lower primary filter 70 and an upper secondary filter 71 therein, preferably comprising packs of any material found desirable. I have found excelsior to be satisfactory. These filter packs divide the chamber 68 into a lower compartment 72, an upper compartment 73 and an intermediate compartment 74.

The tank 65 is provided with lower pipe coupling connections 80 and 81, best shown in Fig. 2, opening into compartment 72, adapted to receive various pipes as described. In the system A, shown in Figs. 1 and 2, the pipe 51 leading from the stage C has an attachment to the coupling connection 80, and extends into the compartment 72 wherein it has a perforated discharge nozzle 82. The other connection 81 receives and supports a water dumping pipe 84 which opens at 85, centrally in the bottom of the compartment 72. This pipe 84 externally of the tank 65 has a dump valve 86 provided with control means 87 operatively connected with a torque tube liquid level control 88 mounted in the coupling connection 89 of the tank 65. This connection 89 is located in the vicinity of the intermediate compartment 74 in order that the float 90 of the control 88 may operate in the compartment 74 at the dividing level of the oil and water; the difference in density of the two liquids operating it for the purpose of dumping separated water from the compartment 72, through the line 84.

In the stage D the top nipple 91 of the tank has a line 92 connected to the heat exchange device E. In this line 92 is disposed a pressure regulating valve 93 for holding pressure in the stage D at the desired amount, which may vary from 10 to 50 lbs. superatmospheric. There will be a drop of pressure upon the oil and gas after passing valve 93 and this causes condensation of gas vapors and cools the oil.

In the filter tank 65 the heat treated oil and water enter the compartment 72. The primary filter 70 assists mainly in separating water from oil. It should be mentioned that the filter material is originally soaked in water as an aid to separation. Oil collects in the top of the intermediate compartment 74. What water is still present is filtered out in the secondary filter pack 71. These filters remove mud and sand, most of it at the primary filter. The emulsion broken product enters the compartment 72 between 120° F. and 150° F. and loses its heat, so that at discharge into the line 92 the recovered oil has a temperature of about 90° F.

The heat exchanger E may include a container 95, preferably horizontally positioned and having a chamber 96 therein. The line 92 opens at one end into the container 95 permitting the hot oil to flow lengthwise through the chamber 96 and it exits to storage through a line 97. The incoming emulsified water, oil and gas enters a header in the heat exchanger through a line 98. Within the chamber 96 the header is divided into a plurality of spaced pipes 99 connected with a discharge header 100. The header 100 is connected to line 16 leading to the free water knockout B.

It is entirely possible to operate this system without the use of the free water knockout stage B. In that event the line 16ª has connection with the heat exchanger at its discharge end and leads directly to the nipple 30ᵇ of the heat treating C, as shown in dot and dash lines in Fig. 1 of the drawings. Pressure regulating valves 101 and 101ª will of course be used in the lines 16 and 16ª to maintain pressure in the systems of the stages with which they are connected.

Referring to the system of Figs. 3 and 4, the heater and filter stages C¹ and D¹ are used. They produce a high gravity oil without gas separation.

Referring to the heater stage C¹, the above mentioned control connections 46 and 47 are sealed off. The nipple 30ᵇ is also sealed off by a plug 30ᶜ. The connection 56 has coupled therewith the inlet line 110 for inflow of the petroleum emulsion into the chamber 32ᵃ of the tank 32. In the tank 32 of stage C¹ it is not necessary to provide a partition such as is used in the heater tank of Figure 1. The line 110 passes upwardly through the tank chamber and has a central outlet 110ᵃ opening at the top center of the tank chamber. The nipple 57 is closed by a plug 57ᵃ. The emulsion from the line 110 drops downwardly through the chamber 32ᵃ towards the tubes of furnace 38. The connection 52 has a line 112 which leads to and is connected with the connection 89ᵃ of the filter tank 65 for a purpose to be subsequently described. An inverted cone shaped baffle 115 is mounted in the chamber 32ᵃ between the furnace pipes and the bottom wall 34. The pipe 112 is downturned at 116 in the chamber of this baffle, for flow of the broken emulsion through line 112 into the filter tank as will be subsequently mentioned. Water discharges from the bottom of the compartment 32ᵃ from, below the baffle 115 through a line 53ᵃ which is coupled to the connection 53 of the tank and passes externally of the tank through line 54ᵃ.

Referring to the filter stage D¹, connection 80 of tank 65 receives a discharge line 125 wherein is located a water dump valve 126. This line 125 has an end extending inwardly and curved downwardly to the bottom of the compartment 72, as shown in Fig. 3. The dump valve 126 is controlled by means of a torque tube liquid level control 127, coupled to the connection 89. Its float 128ᵃ is located in the intermediate compartment 74, for operation through differential density of the water and oil.

Gas is not vented from the system shown in Figs. 3 and 4. A line 121 is connected between the nipple 120 at the top of the chamber 32ᵃ and extends into the top compartment 73 of the filter stage D¹. In the top of the heater chamber 32ᵃ, the line 121 is valve regulated by means of a float 122 which operates on the top level of liquid within the chamber 32ᵃ. Thus, rich gases at the top of the heater tank pass through the line 121 and condensed in the compartment 73 for admixture with the recovered oil.

Discharge of oil from the filter tank of stage D1 is had through a vertical pipe 128 which extends through the tank 65. It has an end 129 opening in the top compartment 73 centrally thereof. The lower end of this pipe 128 is coupled to the connection 81 and externally of the tank 65 it has a pressure regulating valve 130 (Fig. 4) for maintaining back pressure in the filter stage D¹.

Referring to the system shown in Figs. 5 and 6, the heater tank C² has the compartment 36 above the baffle wall 35 communicated with the lower compartment 37 by means of a downwardly extending pipe 135 which is connected to nipple 43. This nipple was plugged in the system A of Fig. 1 above described. The emulsified petroleum enters the heater tank through a line 138 at the lower part of the tank through a connection 38ᵃ (see Fig. 6). Pipe 138 extends vertically through compartment 37, through partition 35 and opens into the top of compartment 36. The emulsified petroleum discharges into compartment 36 upon a baffle 139. The emulsified petroleum flows downwardly from compartment 36 through line 135 and discharges at the bottom of compartment 37 upon the baffle 137. If desired, a water dump line 140 may be placed in the connection 52, although it is shown plugged in the stage C² of Figs. 5 and 6.

A gas vent for the heater C² is provided, including a line 145 which has a slotted opening centrally at the top of the compartment 36, at 146, below the closed nipple 57. The gas travels downwardly through the pipe 145 and is coupled to the connection 53. Externally of the tank the gas discharge line 145 is provided with a pressure regulating valve 147 (see Fig. 6).

A line 148 is coupled to the tank connection 56 of the heater stage C² and extends into the filter tank at connection 89ᵃ and has a discharge nozzle 150 in the lower compartment 72. The pipe 148 in the compartment 37 of stage C² has an opening at its top end immediately below the partition 35, as shown in Fig. 5. The connections 42 and 47 are closed. The rich gas in the top of the compartment 37 and broken emulsion at the top of this compartment pass downwardly through the line 148 and into the bottom compartment 72 of the filter tank. The rich gas in compartment 37 is trapped and cannot enter the upper compartment 36. Valve 149 is located in line 148. It is operated by a control 149ᵃ secured to connection 46 of stage C².

By means of plug 42 gases from below partition 35 can be mixed with gases in compartment 36, or maintained separated by plugging and kept in the oil and condensed by cooling to maintain oil at desired gravity.

A dump line 155 is coupled to connection 80 of the filter tank in the system shown in Figs. 5 and 6, and has a downturned end 156 in the compartment 72 at the center lower part thereof. A dump valve 157 is automatically controlled by means of a torque tube liquid level control 160, coupled to the connection 89.

For the system shown in Figs. 5 and 6, the same oil discharge line system is provided as shown for the system of Figs. 3 and 4 and identical reference characters have been applied for both systems.

Surrounding the slotted end 146 of the gas discharge pipe 145 for the system of Fig. 5 is a laterally perforated mist collector 160; the condensate collecting therein and discharging through a pipe 161 into the chamber 36.

In the system shown in Figs. 5 and 6, an equalizer tube shown in dot and dash lines at 163 may be used in lieu of the system described.

Referring to the system shown in Figs. 7 and 8, emulsified oil enters the tank 32 of the heater stage C³ through the line 170. It hits a baffle 171 above the discharge line 135, which is similar to the system shown in Figs. 5 and 6 and discharges the emulsified oil onto the baffle 137 as shown in Fig. 7.

At the top of the heater stage C³, the tank has a formation gas vent line 171 connected to nipple 57. This line is provided with a pressure regulating valve 172 adapted to maintain back pressure in the tank at substantially 30 pounds. The nipple 42 is plugged at 42ᵃ.

In the stages shown in Figs. 7 and 8, instead of mixing the gas with emulsified liquid in the compartment 37, a gas line 175 is connected with nipple 60. It opens into the top of compartment 37 wherein the rich gases collect; this line 175 having connection with the filter top compartment 73. A float operated valve 176 disposed in the top of the compartment 37, vents the gas through this line 175.

In the system of Figs. 7 and 8, the connection 53 is plugged, as is also the connection 38ᵃ. The broken emulsions discharge through the line 148 into the filter tank, the same as for the stage described in Figs. 5 and 6. However, water is knocked out of both the heater and filter stages of Figs. 7 and 8 into a common discharge line 180. The latter is coupled with the connections 52 and 80. The line 180 is provided with individual dump valves 182 and 183 for the heater and filter tanks, automatically controlled by means of torque tube liquid level controls 184 and 185 respectively coupled to the tank connections 47 and 89. This system is generally used where there is a large portion of free water in the emulsified petroleum.

In the systems of Figs. 5, 6, 7 and 8, the incoming oil above the baffle 137 displaces 140° F. heated mixture at the bottom of the tank.

In the system shown in Figs. 7 and 8, the floats of both of the controls 184 and 185 operate at the differential density level between water and oil for the purpose of controlling the dump valves.

The multiple stage apparatus shown in Figs. 9 and 10 has many of the characteristics of the form of invention shown in Fig. 1 including a free water knockout tank $B^4$, a heater tank $C^4$ and the filter and stabilizing tank $D^4$. This multiple unit is known as a downflow treatment of the emulsified oil.

The free water knockout $B^4$ includes a tank $10^a$, similar to the tank 10, having a chamber $11^a$ therein. Supported by a baffle $13^a$, connected to the dome of the tank $10^a$ is a pipe $17^a$ which has a chamber $18^a$ therein. A distributing head $19^a$ is adjustably supported by the lower end of the pipe $17^a$ for the same purposes described in connection with like structure shown in Fig. 1 of the drawings. An emulsified oil inlet pipe $16^a$ enters the tank $10^a$ from the top and discharges the emulsified oil and water into the chamber $18^a$ of the pipe $17^a$.

A discharge line $25^a$ is connected in the lower portion of the tank having a curved end $26^a$ within the tank $10^a$ for receiving free water from the central bottom of the tank. An oil discharge line $30^d$ is connected in the tank $10^a$ having an upstanding end $30^e$ therein with an entrance end located at the top of the tank $10^a$ in facing relation with respect to the baffle $13^a$ for receiving emulsified oil from the upper part of the tank and transmitting it through the line $30^d$ into the heater $C^4$. A dump valve $27^a$ is provided in the line $25^a$, controlled by float means $29^a$ in the chamber $11^a$ of the tank $10^a$ for dumping water from the tank $10^a$. The float $29^a$ lies at the interface between the free water and emulsified oil thereabove. This interface is located at about the dotted line position $27^b$ shown in Fig. 9.

The system shown in Figs. 9 and 10 has the liquid under hydrostatic pressure to compel continuous flow of oil and water.

Referring to the heat treating stage $C^4$, the same includes a tank $32^b$ having the main characteristics of the heater tank $C^1$ shown in the system of Fig. 3. The tank $C^4$ has a single chamber $37^a$. The oil inlets to the heater from line $30^d$ through a vertically disposed line $30^f$ disposed in the compartment $37^a$ and outlets at a top curved end $30^g$. This permits the oil and water emulsion to drop from the top compartment $37^a$ downwardly over the tubes of the heater $38^b$.

An inverted cone shaped baffle $115^a$ is disposed in the lower portion of the tank portion of the tank $32^b$ between the furnace pipes and the bottom wall of the tank. An oil discharge line $112^a$ extending between the heater and filter tanks has a portion in the compartment of the tank $32^b$ over the baffle $115^a$ to receive oil for transmittal into the filter tank $D^4$. A water dump line $53^b$ extends into the tank and has a central downturned end $53^c$ therein for receiving water to be dumped. This water may be dumped by pressure or valve control. A gas line $121^a$ extends between the heater tank and the filter tank, opening into the compartment $37^a$ at the top thereof. The discharge of gas into the upper portion of the filter tank is regulated by a float controlled valve $122^a$, the float of which operates at liquid level in the tank $32^b$ designated by the dot and dash line shown in the compartment $37^a$ of Fig. 9.

The filter and stabilizing stage $D^4$ as shown in Fig. 9 has structural features the same as those shown for the filter stage $D^1$ in Fig. 3, and the same reference characters as used in Fig. 3 have been applied thereto. The perforated distributing pipe $112^b$ of the tank $D^4$ receives oil through the line $112^a$. The pipe $128^b$ receives the filtered oil at the top of tank 65 for transmittal through the line $81^a$ to storage (see Fig. 10). In line $81^a$ is located a pressure regulating valve $130^a$ for maintaining back pressure in the filter stage.

The equipment of Figs. 11 and 12 is used for upflow treatment of the emulsion in the heating stage. This multiple setup has the free water knockout stage $B^5$ substantially identical with respect to the free water knockout stage $B^4$, shown in Fig. 9, and the same reference characters, for similar parts, have been applied to the stage $B^5$ and need not be here described except to state that the oil passes into the pipe $30^e$ and discharges into an oil outlet line $30^h$, shown in Figs. 11 and 12. The free water from the stage $B^5$ discharges through the downturned tubular portion $26^a$ from the stage $B^5$ into the water dump line $25^b$ wherein is located a dump valve $27^b$ regulated by the float $29^a$ at the emulsion-free water interface in tank $10^a$.

The stage $C^5$ shown in Figs. 11 and 12 has structural features quite similar to those shown in the heater stages of Figs. 1 and 9. A furnace $38^c$ is provided in the compartment $37^b$ of the tank $32^c$ of the heater stage. A lower centrally disposed baffle $115^b$ is placed in tank $32^c$. A pipe $30^h$ enters the lower portion of the tank $32^c$ and has a discharge end $30^k$ therein. The oil emulsion flows upwardly through the compartment $37^b$. A water drawoff tube $53^d$ is provided in the tank $32^c$ and is connected in the line $25^b$ at $25^c$ (see Fig. 12). An automatically operated dump valve $53^e$ is provided in the line $25^c$, as shown in Fig. 12, controlled by a float $49^a$ located at the interface level shown by the dotted line in Fig. 11. Discharge of oil-water takes place at the top of the compartment $37^b$ passing through line 200 under hydrostatic pressure into a line $112^c$ into the distributing pipe $112^d$ located in the filter and stabilizing stage $D^5$. The latter possesses the same structural and functional characteristics as the filter stages of the form of the invention shown in Figs. 1, 3 and 9 and the same reference characters have been applied to similar parts thereof.

From the above description it will be obvious that the main difference between the multiple stages shown in Figs. 9 and 11 resides in the fact that in the heater stage $C^4$ of Fig. 9 the oil and water flow from the free water knockout stage enters the top of the heater tank and flows downwardly and in the heater stage $C^5$, shown in Fig. 11, the oil and water flows upwardly with an oil discharge into the stabilizing stage from the top of the tank $32^c$.

Figure 13:
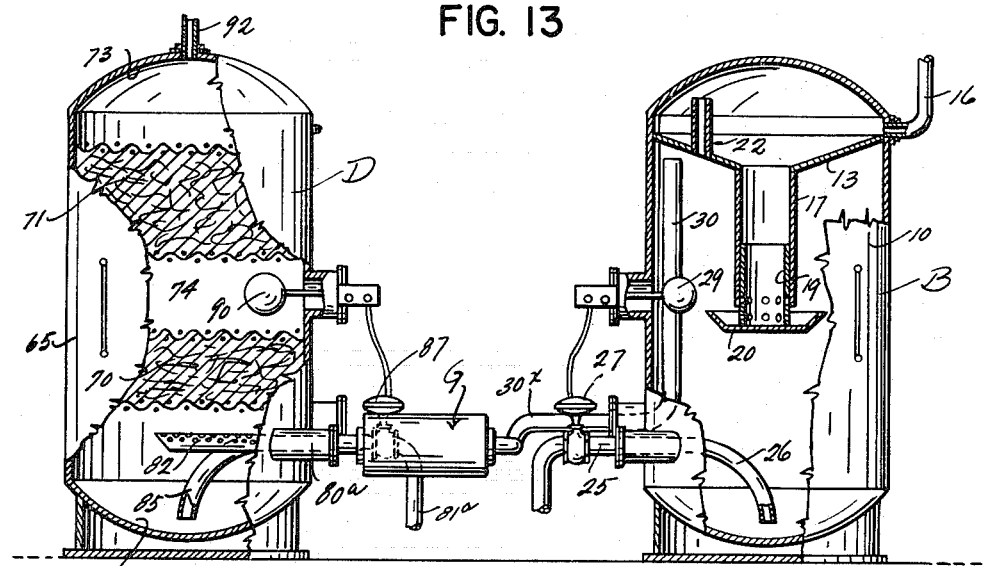
Fig. 13 is a fragmentary side elevation of a multiple stage system for the resolving of hydrocarbon emulsions, including therein an ultrasonic transducer for breaking emulsions.
Figure 14:
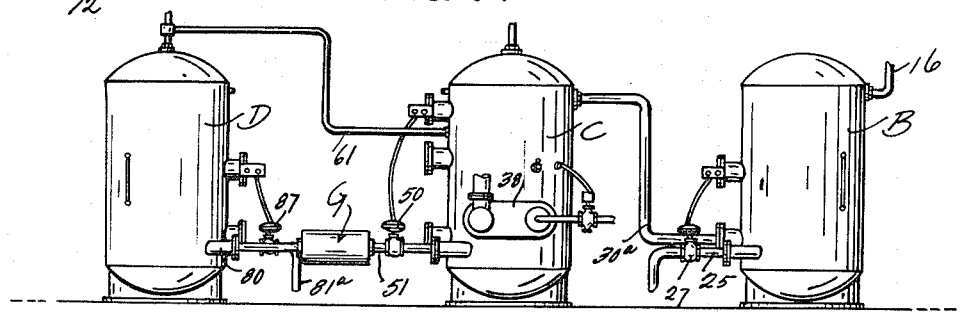
Fig. 14 is a side elevation of a system such as shown in Fig. 1, wherein is disposed an ultrasonic transducer between a heater unit and a filter unit.

I have found that the use of sonic energy can be used for the purpose of breaking oil-water emulsions, in a continuous flow process. To that end, as shown in Fig. 13, I may use an electroacoustic transducer "G" in the oil flow line between a free water knockout unit and a filtering and stabilizing unit, eliminating the heating unit. Also, as shown in Fig. 14, I may use the transducer "G" in the oil line connection between the heating stage and the filtering and stabilizing stage, in a multiple stage treating system which includes also a free water knockout. On the other hand, as shown in Fig. 15, I may use the transducer "G" in the oil line connection between a free water knockout stage and the heater stage; this system also using a filtering and stabilizing stage.

Figure 15:
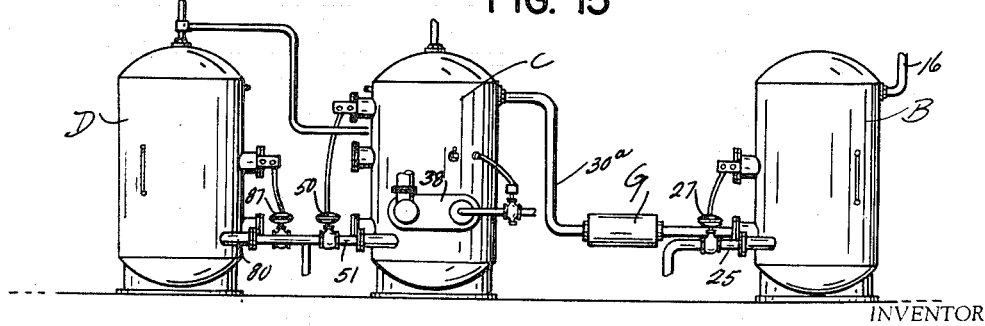
Fig. 15 is a side elevation of a multi-stage system for resolving hydrocarbon emulsions wherein an ultrasonic transducer is used between a free water knockout stage and a heat treating stage, for the treatment of emulsions for breakdown thereof.

For multiple stage treatment I may use any of the units of the various multiple stage systems above described, but as shown in said Figs. 13 to 15 inclusive, I preferably utilize the units B, C and D, shown in Figs. 1 and 2, and similar reference characters in Figs. 13 to 15 correspond to those used for like parts shown in Figs. 1 and 2. These parts will not again be described except to state that the transducer "G" in Fig. 13 is located in the oil-water line connection $30^x$ which receives the oil-water from the free water knockout B, shown in Fig. 13; the oil-water emulsion being broken down in the electroacoustic transducer "G" and discharged therefrom through a line $80^a$ into the distributing pipe 82 in the filtering and stabilizing unit D. This system eliminates the heating stage.

The multiple stage arrangement shown in Fig. 14 is identical with that shown in Fig. 1, except for the transducer "G" which is located in the oil line connection 51 and discharges into the line 80 leading into the filtering unit D. Likewise, in Fig. 15, the units are the same as shown in Fig. 14, except the electroacoustic transducer "G" is shown as located in the oil line connection 30ª between the free water knockout stage and heater stage.

Figure 16:
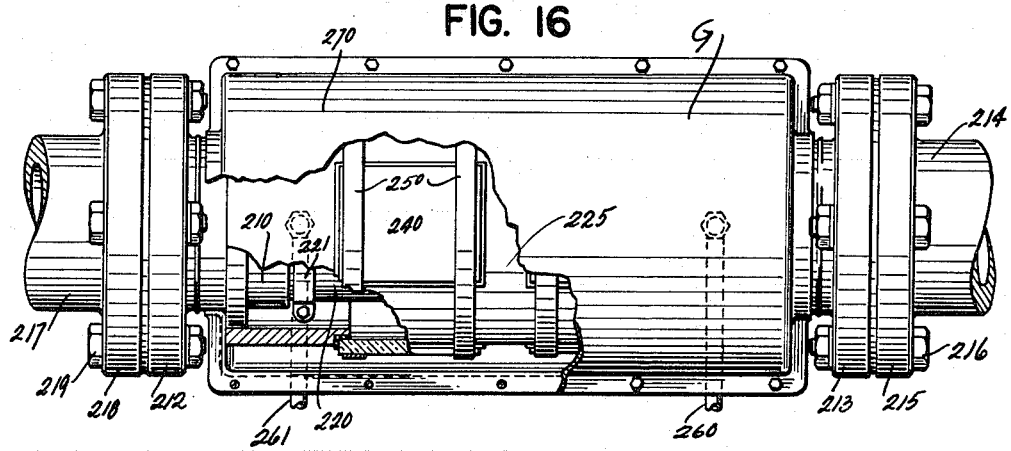
Fig. 16 is a plan view, partly in section, of a sonic vibrating transducer employed in the systems shown in Figs. 13, 14 and 15.
Figure 17:
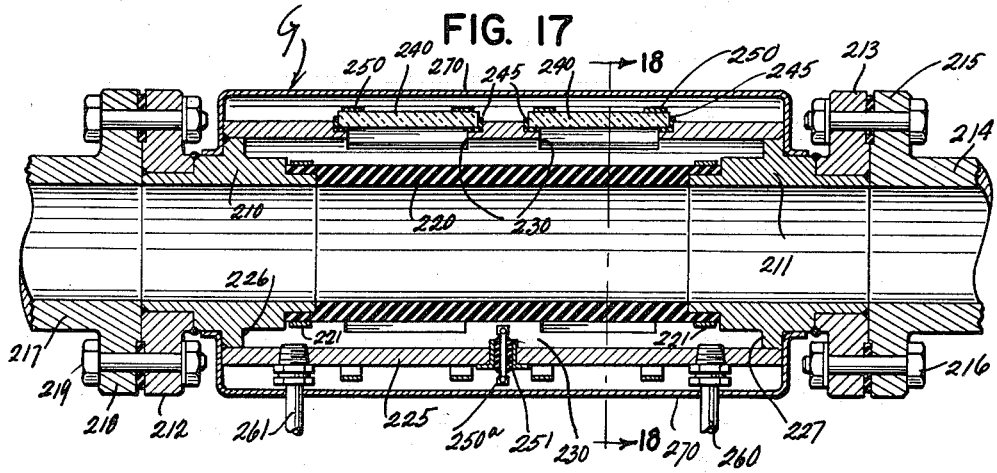
Fig. 17 is a longitudinal cross sectional view taken through the transducer.
Figure 18:
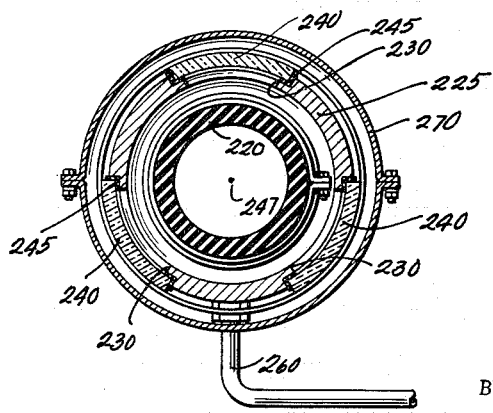
Fig. 18 is a transverse cross sectional view taken through the transducer, substantially on the line 18—18 of Fig. 17.

The electroacoustic transducer "G" as shown in Figs. 16, 17 and 18, preferably comprises tubular end portions 210 and 211 to which pipe coupling flanges 212 and 213 respectively may be attached, as by welding. The oil-water emulsion entrance conduit 214 may be connected by means of its flange 215 to the flange 213 by detachable bolts 216. The oil-water exits through a conduit 217 which may have a flange 218 connected by bolts 219 to the flange 212. To complete the flow line between the tubular portions 210 and 211, a rubber window 220 of "RHO-C" rubber as manufactured by B. F. Goodrich Company. It may be of "Neoprene" or other material of proper acoustic impedance to permit sound of any frequency to pass through it without reflective loss and with relatively little attenuation. It is tubular in form and has the reduced ends secured to the adjacent reduced ends of the tubes 210 and 211 by clamping bands 221. The passageways through the portions 210 and 211 and the rubber window 220 are preferably of the same diameter as the flow passageway in the lines 214 and 217. A tubular supporting frame or casing 225 is mounted upon the outer peripheral surfaces of flanges 226 and 227. The latter are positioned about midway externally upon each of the tubular connections 210 and 211, and the casing 225 is preferably welded to these flanges. This provides a coolant flow space 230 surrounding the rubber window 220 and extending between the flanges 226 and 227. The tubular casing 225 is preferably provided with annular series of relatively spaced openings 230 at a number of zones around the casing 225, each of which receives, in liquid sealed relation therein, transducer elements or vibrating members 240. Two annular series of these transducer elements are shown, but more may be provided if necessary, and in each of the series, three of the transducer elements are provided. This number may vary. The transducer elements 240 are arcuate in shape and mounted in the openings 230 in sealed relation upon resilient cushions 245 of a cork-neoprene composition. The central point of the radius from which the arc or circle in which the transducer elements lie, in each series, is located in the axis line of the passageway through the rubber window 220, designated at 247 in Fig. 18. The arcs of the inner and outer surfaces of each transducer element are both struck from radii having the axis 247 as a center. Annular clamping bands 250 may be provided to hold the transducer elements in place adjacent each of the resilient cushions 245. An electrically conductive connector 250ª may be mounted in an insulation bushing 251 in the casing 225 for electrical energy transmission to the surface electrodes of the transducer elements 240.

The vibrating elements 240 are of barium titanate, although other thickness expanders may be used. Preferably they have a thickness mode resonance of approximately 200 kc. They are coated inside and outside with silver electrodes, and as before stated shaped so that the focus of radiated sound lies in the axis of the passageway through the rubber window 220. They are capable of handling power to the extent that the sound intensity of the focus is approximately 160 db above 1 dyne per square centimeter.

The coolant space 230 is preferably provided with an inlet line 260 and an outlet line 261. The coolant flows continuously and may be water or a light oil, such as caster oil. If an oil is used some auxiliary means must be provided for degassing. This coolant serves as a sonic vibrating conducting medium between the surface of the transducer elements and the rubber window 220.

A removable dust excluding cover 270, of any approved material may be employed to enclose the tubular frame 225 and the transducer elements 240. It will be noted that the transducer elements 240 are air backed, in order to provide a reflective boundary, that is, a backing whose acoustic impedance differs materially from that of the vibrating element. This causes the energy which would normally be radiated from the outer surface of the transducer elements to be reflected back into the cylindrical rubber window. The focal area within the window 220 exhibits cavitation in a cylindrical section of about one inch in diameter. This comprises a sectional area appreciably less than the total sectional area of the passageway through the rubber window. As a result of such cavitation, water vapor in the oil is released in free bubble form.

In lieu of the specialized window 220 above described a very thin metallic member may be used as the sound transferring agent. The thickness thereof must be limited to less than quarter wavelength.

The vibrating means may be attained by magnetostriction or even by mechanical vibrating generators. I do not desire to be limited to particular frequencies, although roughly the results desired are attainable by frequencies of from 200 kc. to 400 kc. If lower and higher frequencies of vibration are desired I may use other vibrating means than that described. The sound intensity at the focus must be above the cavitational level.

In connection with the electric power needed for excitement of the transducer elements 240, the source of high frequency electrical power may be attached to the conducting connector 250. In one model, a power level of approximately 1 kw. was used.

Without being restricted to the theory of operation involved in breaking down the hydrocarbon emulsions, it appears that water appears in two forms, in such emulsions, to wit, free water and water vapor. Small but finite drops of free water are dispersed in the oil, apparently being trapped by surface tension. Sonic vibration will readily remove or separate both types of water from oil.

While the transducer "G" is shown as located on a horizontal axis, I intend to use the same on a vertical axis with any approved means to provide a continuous flow of the emulsion through the sonic vibrator. This is effected by mechanical means or through use of a hydrostatic head which I have above mentioned as a characteristic of my multiple stage system.

I may use means at the transducer or adjacent to the discharge end thereof for removing water and condensing and removing water vapor.

It will be apparent from the foregoing description that a very compact and efficient system has been provided including separate stage tanks each of substantially the same volume. They are comparatively low in height and small compared to conventional demulsifying equipment. While the dimensions given are not to be restrictive the multiple stage treatment of the systems described use tanks not exceeding 9½ feet in height. They vary only in diameter to obtain capacities; the diameters varying between 4 feet, 6 feet and 8 feet, etc.

Utmost efficiency is obtained because of oil-gas separation, free water removal, heating, and filtering. Erection costs are low compared to costs incidental to high tower systems and the piping layout is economical, not only because it is low and available, but also because the connections of the three tanks of the system are interchangeable to serve the hook-up of various systems depending upon the constituent proportions of the emulsified petroleum to be treated.

The pressures mentioned herein are all superatmospheric.

It will be noted that all pipe connections are made at the facing sides of the tank, with the possible exception of pipe 16. This enables standardized connections to be made for the various setups. Furthermore, in very cold climates the spaces between the tanks may be enclosed and insulated in order to heat from stage C and keep all of the pipes, valves and controls from freezing.

In the stage C¹, the water dump line 54ª is shown without a pressure regulating valve. Also in the stage C² the water dump at 52 may have a line leading to any desired water deposit source. These lines do not necessarily have pressure regulating valves therein to hold superatmospheric pressures in tank 32 because the water in the dump line is under hydrostatic back pressure.

In multiple stage equipment of the sort described, the ultrasonic vibrator is used as a means for more economically demulsifying hydrocarbon emulsions, in a continuous flow system, so as to produce oil which falls within the regulations setup for the transmission of oil to pipe lines.

I do not desire to be limited to the braking of oil-water hydrocarbon emulsions, since the use of the sonic vibrating means in a continuous flow process may be utilized for the breaking and separation of component parts of other fluid emulsions.

Various changes in the steps of the described methods and system, and alterations and changes in and to the shape, size and arrangement of parts may be made to the structures herein illustrated and described, without departing from the spirit of the invention or scope of the claims.

What is claimed is:

1. The method of separating petroleum gas-oil-water emulsions in a continuous flow process which consists of initially treating a body of such emulsion for the removal of free water therefrom, transmitting the emulsion to a second stage treatment in a confined body under superatmospheric pressure and there subjecting the emulsion to a heat treatment for resolving the emulsion, transmitting the water and all of the demulsified oil in a confined body to a third stage filter and stablizing treatment under superatmospheric pressure and in said third stage treatment separating water from the oil.

2. A method as defined in claim 1 wherein the heated oil from the third stage treatment is transferred in heat exchange relation with the emulsion fed to the first stage treatment.

3. In a method for separating hydrocarbon gas-oil and water emulsions the steps which consist in a continuous flow treatment of a body of the emulsion where in a first stage treatment the gas vapor is permitted to bubble through the liquid emulsion, releasing free water from the emulsion in said first stage treatment, subjecting the residue oil emulsion to a continuous flow heat treatment under superatmospheric pressure in a second stage treatment for resolving the emulsion, subjecting the resolved body of emulsion to a third stage continuous flow filter treatment under superatmospheric pressure for separating water from the oil, and transmitting rich vapor ends from the second stage treatment and condensing the same in the oil recovered in the third stage treatment.

4. A method as defined in claim 3 in which the recovered oil from the third stage treatment is transferred in heat exchange relation with the emulsified gas-water-oil product which is used in the first stage treatment.

5. The steps in the method of resolving hydrocarbon gas-oil and water emulsions which consists in heat treating the hydrocarbon emulsions for resolving the same in a chamber where the emulsion is maintained under superatmospheric pressure, withdrawing rich gas vapors from the emulsion during the heat treatment thereof, passing the resolved emulsion into a second stage treatment wherein the water is filtered from the oil under superatmospheric pressure, withdrawing free water from the filter treating stage, and condensing the rich vapor ends from the heat treating stage into the body of oil separated from water in the filter treating stage.

6. A method as defined in claim 5 wherein the hydrocarbon emulsion is passed in the heat treating stage directly into the heated portion of said emulsion with a downflow of the same into the heating zone.

7. The steps in the method of resolving hydrocarbon emulsions into their constituent gas-oil and water parts which consists in a continuous flow treatment of a hydrocarbon emulsion in separate heating and filtering stages under superatmospheric pressures wherein the heating stage includes a step of releasing rich vapor ends and condensing them in the reclaimed oil body of the filter stage treatment after separation of water from said body of oil in the filter stage treatment.

8. The steps in the method of resolving hydrocarbon emulsions into their gas-oil and water constituents which consists in subjecting the body of emulsion to a heat treatment under superatmospheric pressure, and during such treatment withdrawing separated water and a portion of the recovered gas, subjecting all of the resolved emulsion to a filter treatment under superatmospheric pressure, and withdrawing free water separated from the oil in the filter treatment.

9. A method as defined in claim 8 in which a portion of recovered rich vapor ends from the heat treating stage are transferred and condensed in the body of recovered oil in the filter stage treatment.

10. A method of separating petroleum gas-oil-water emulsions as described in claim 1 wherein there is a downflow of the oil-water emulsion in the initial treatment for separation of water, and in which there is a downflow of the emulsion in the second stage treatment, and in which there is an upflow of oil and water in the third stage treatment.

11. A method of separating petroleum gas-oil-water emulsions as described in claim 1 wherein there is a downflow of the emulsion in the initial treatment for separation of free water from the water emulsion, and in which there is an upflow of the emulsion in the second heat treating stage, and in which there is an upflow treatment of the oil-water in the third stage treatment.

12. Apparatus for resolving hydro-carbon emulsions comprising a first stage treatment including a tank having heating means therein, means for transferring hydrocarbon emulsions into said tank for direct contact with the heating means for breaking the emulsion, a second stage treatment including a tank having filtering means therein, means to transfer broken emulsion from the heater tank to the filter tank and for separating therein the oil and water of the broken emulsion, means for draining free water from the filter tank, means for maintaining the products in both the heater tank and filter tank under superatmospheric pressure, and means for passing rich vapor gases from the heater tank into the reclaimed body of oil of the filter tank for mingling with and condensing in said reclaimed oil.

13. Hydro-carbon emulsion treating apparatus as described in claim 12 in which a free water knockout tank is provided as an initial stage treatment of the hydrocarbon emulsion, means for draining free water from the water knockout tank, and means for transmitting the hydro-carbon emulsion from the free water knockout tank into the heater tank.

14. In a multiple stage treatment for resolving hydrocarbon emulsions, the combination of a free water knockout device comprising a receptacle having a chamber therein, a transverse partition in said receptacle subdividing the chamber into an upper compartment and a lower compartment, means for feeding emulsion into the upper compartment, a tube depending from the partition into the lower chamber having a passageway therein communicating the upper compartment with the lower compartment and having means at the lower end thereof for divided flow of the emulsion into an intermediate area in the height of the lower compartment, means for withdrawal of free water from the lower part of the lower compartment, means for withdrawal of the emulsion from the upper part of the lower compartment, a heating tank having a chamber therein, a partition in said heating tank sub-dividing the chamber thereof into an upper compartment and a lower compartment, means for transmitting the withdrawn emulsion from the knockout into the upper compartment of the heating tank, heating means in the lower compartment of the heating tank, means for transmitting the emulsion from the upper compartment of the heating tank into the lower compartment of the heating tank, means for withdrawing resolved emulsions from said lower compartment, means for withdrawing rich vapor ends from the upper part of the lower compartment, a filter tank having a chamber therein, filtering means disposed in said chamber, means for transmitting resolved emulsions from the heating tank upwardly in the filter tank through the filtering means whereby reclaimed oil collects in the top of the filter tank and water collects in the bottom of the filter tank, means for withdrawing water from the bottom of the filter tank, means for withdrawing oil from a location in the top of the tank above the filtering means, and means for admixing and condensing the rich vapors withdrawn from the heating tank with the oil reclaimed at the top of the filter tank.

15. In a multiple stage method for treatment and resolving of hydro-carbon emulsions, the steps which consist in separating free water from emulsified oil and gas under superatmospheric pressure, heat treating the separated emulsion under superatmospheric pressure for demulsifying the emulsion, filter treating the resultant demulsified oil for separation of any residue water therefrom, and admixing a portion of rich gas ends from the heat treatment step with the oil after the filter treatment.

16. In a multiple stage treatament for resolving hydro-carbon emulsions, the combination of a free water knockout device for separating free water from emulsions comprising a tank having a chamber therein, a tube supported in said chamber having a passageway therein, means for depositing an emulsion in the passageway of said tube, means at the lower end of said tube for distributing the emulsion and free water therein into the chamber of the tank, a free water drawoff line connected with the lower part of the tank below the outlet of said tube, a valve in said free water drawoff line, operating means for said valve actuable by the interface of free water and emulsified liquid in the tank and at a plane above the lower outlet of said tube, a heater tank having a chamber therein, a heater in said chamber of the heater tank at an intermediate portion in the height thereof, means connecting said tanks for transferring hydro-carbon emulsions from the knockout tank into the heater tank to the upper portion of the heater tank for downflow treatment over the heater means, means for withdrawing resolved emulsions from the lower part of the chamber of the heater tank below the heater means, means for trapping and removing rich vapor ends from the heater tank, means connected to the heater tank for withdrawing water from the lower part of the chamber thereof below the point of exit of the resolved emulsions from the heater compartment, a filter tank having filter means therein, means connecting the heater tank and filter tank for transfer of the resolved hydro-carbon emulsions from the heater tank to the filter tank, means for filtering the resolved hydro-carbon emulsions from the heater tank in said filter tank, and means for transferring the withdrawn rich vapor ends of the heater tank into the body of filtered oil reclaimed in the filter tank.

17. A multiple stage treatment for resolving hydro-carbon emulsions comprising a free water knockout tank, a heater tank, a filter tank, means for flowing a body of hydro-carbon emulsion into the free water knockout tank, means for withdrawing separated free water from the free water knockout tank, means for transmittal of the body of emulsion after free water separation from the free water knockout tank to the heater tank, means in the heater tank for heating and resolving the emulsion therein, means for transmitting substantially the entire body of resolved emulsion into the filter tank, filtering means in said filter tank for filtering water from the oil, means for withdrawing separated water from the filter tank, means for recovery of the resolved oil from the filter tank, and controls upon said tanks for maintaining superatmospheric pressure upon the products treated as aforesaid in each of said tanks.

18. Apparatus for resolving hydro-carbon emulsions comprising a heater tank having a chamber therein and means to feed hydro-carbon emulsions into said chamber, a heater in the chamber of the heater tank for heating and resolving the emulsion therein, a filter tank having a filter means therein, means for transmitting resolved emulsions from the heater tank into the filter tank at a locus below the filter means, means below the filter means for withdrawing separated water from the filter tank, means above the filter means for withdrawing recovered oil, and means for maintaining the contents in the heater and filter tanks under superatmospheric pressures.

19. The steps in the method of resolving hydro-carbon gas-oil and water emulsions which consists in heat treating the hydro-carbon emulsions under superatmospheric pressure for resolving the same, subjecting the resolved hydro-carbon emulsions to a filter stage treatment wherein the water is filtered from the oil under superatmospheric pressure and wherein the oil is reclaimed under superatmospheric pressure, and releasing the reclaimed oil and its entrained rich vapor ends from the superatmospheric pressure under which maintained in the filter stage.

20. An apparatus for resolving hydro-carbon emulsions comprising a heater tank having heating means therein, means for transferring hydro-carbon emulsions into said heater tank for direct contact with the heating means for breaking the emulsion, a tank having filtering means therein, means to transfer broken emulsions from the heater tank to the filter tank and for separating therein oil and water of the broken emulsion, means for discharging free water from the filter tank, means for maintaining the hydro-carbon products in both the heater tank and filter tank under superatmospheric pressure, and means for releasing the reclaimed oil and gas vapors from the superatmospheric pressure under which maintained in the filtered tank.

References Cited in the file of this patent

UNITED STATES PATENTS

| | | |
|---|---|---|
| 1,781,076 | Palmer | Nov. 11, 1930 |
| 1,948,481 | Turner | Feb. 20, 1934 |
| 2,087,442 | Nack | July 20, 1937 |
| 2,211,171 | Self | Aug. 13, 1940 |
| 2,257,997 | Barnes | Oct. 7, 1941 |
| 2,338,986 | Waterman | Jan. 11, 1944 |
| 2,384,222 | Walker | Sept. 4, 1945 |
| 2,400,713 | Phees | May 21, 1946 |
| 2,449,738 | Dake et al. | Sept. 21, 1948 |
| 2,457,959 | Walker | Jan. 4, 1949 |
| 2,474,475 | Glasgow | June 8, 1949 |
| 2,562,653 | Williams | July 31, 1951 |
| 2,593,228 | Wagner | Apr. 15, 1952 |
| 2,613,812 | Yancey | Oct. 14, 1952 |